United States Patent
Froehlich et al.

(10) Patent No.: US 12,158,734 B2
(45) Date of Patent: *Dec. 3, 2024

(54) METHOD AND DEVICE FOR DETERMINING MODEL PARAMETERS FOR A CONTROL STRATEGY FOR A TECHNICAL SYSTEM WITH THE AID OF A BAYESIAN OPTIMIZATION METHOD

(71) Applicant: Robert Bosch GmbH, Stuttgart (DE)

(72) Inventors: Lukas Froehlich, Freiburg (DE); Christian Daniel, Leonberg (DE); Edgar Klenske, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 449 days.

This patent is subject to a terminal disclaimer.

(21) Appl. No.: 17/611,549

(22) PCT Filed: May 27, 2020

(86) PCT No.: PCT/EP2020/064676
§ 371 (c)(1),
(2) Date: Nov. 15, 2021

(87) PCT Pub. No.: WO2020/244987
PCT Pub. Date: Dec. 10, 2020

(65) Prior Publication Data
US 2022/0236698 A1 Jul. 28, 2022

(30) Foreign Application Priority Data
Jun. 6, 2019 (DE) ..................... 10 2019 208 262.9

(51) Int. Cl.
*G05B 13/04* (2006.01)
(52) U.S. Cl.
CPC ................. *G05B 13/042* (2013.01)

(58) Field of Classification Search
CPC .................................................. G05B 13/042
(Continued)

(56) References Cited

U.S. PATENT DOCUMENTS

| | | | |
|---|---|---|---|
| 11,762,346 B2 * | 9/2023 | Klenske | ............ G06F 18/24155 700/28 |
| 2003/0099350 A1 * | 5/2003 | Bostoen | ................. H04B 3/487 379/221.15 |

(Continued)

FOREIGN PATENT DOCUMENTS

| | | |
|---|---|---|
| CN | 108508856 A | 9/2018 |
| WO | 2018219943 A1 | 12/2018 |

OTHER PUBLICATIONS

International Search Report for PCT/EP2020/064676, Issued Sep. 3, 2020.

(Continued)

*Primary Examiner* — Jigneshkumar C Patel
(74) *Attorney, Agent, or Firm* — NORTON ROSE FULBRIGHT US LLP; Gerard A. Messina (57) ABSTRACT

Methods for ascertaining a control strategy for a technical system using a Bayesian optimization method. The control strategy is created based on model parameters of a control model and is executable. The method includes providing a quality function whose shape corresponds to a regression function and that evaluates a quality of a controlling of the technical system based on model parameters; carrying out a Bayesian optimization method based on the quality function in order to iteratively ascertain a model parameter set having model parameters within a model parameter domain that indicates the permissible value ranges for the model parameters; and determining the model parameter domain for at (Continued)

least one of the model parameters as a function of an associated maximum a posteriori estimated value of the quality function.

10 Claims, 2 Drawing Sheets

(58) Field of Classification Search
USPC .......................................................... 700/41
See application file for complete search history.

(56) References Cited

U.S. PATENT DOCUMENTS

2018/0349158 A1* 12/2018 Swersky ................ G06N 20/00
2020/0327264 A1* 10/2020 Wang ..................... H02J 3/008

OTHER PUBLICATIONS

Marco et al., "On the Design of LQR Kernels for Efficient Controller Learning," Cornell University Library, 2017, pp. 1-8. <https://arxiv.org/pdf/1709.07089.pdf> Downloaded Nov. 15, 2021.
Neumann-Brosig et al., "Data-Efficient Auto-Tuning With Bayesian Optimization: an Industrial Control Study," Cornell University Library, 2018, pp. 1-11. <https://arxiv.org/pdf/1812.06325.pdf> Downloaded Nov. 15, 2021.
Frazier, "A Tutorial on Bayesian Optimization," Cornell University Library, 2018, pp. 1-22. <https://arxiv.org/pdf/1807.02811.pdf> Downloaded Nov. 15, 2021.
Brochu et al., "A Tutorial on Bayesian Optimization of Expensive Cost Functions, With Application To Active User Modeling and Hierarchical Reinforcement Learning," Cornell University, 2010, pp. 1-49. <https://arxiv.org/pdf/1012.2599.pdf> Downloaded Nov. 15, 2021.

* cited by examiner

METHOD AND DEVICE FOR DETERMINING MODEL PARAMETERS FOR A CONTROL STRATEGY FOR A TECHNICAL SYSTEM WITH THE AID OF A BAYESIAN OPTIMIZATION METHOD

FIELD

The present invention relates to methods for finding a suitable control strategy for a technical system, in particular using a Bayesian optimization method. In particular, the present invention relates to a computer-implemented method for the more efficient optimization of model parameters of a control model for implementing a control strategy for a technical system. In addition, the present invention relates to measures for accelerating the carrying out of Bayesian optimization methods, in order to reduce the computational effort for the parameterization of control strategies.

BACKGROUND INFORMATION

The ascertaining of control strategies or control models for controlling or operating a technical system is costly, depending on the complexity of the technical system. While, given a linear dynamic behavior of the technical system, an optimal controlling can be ascertained using classical methods, in the case of nonlinear physical systems it is however costly to create, or to parameterize, a corresponding control model based on physical relationships.

Alternatively, in order to find a suitable control strategy so-called reinforcement learning can be used. Reinforcement learning includes the observation of the interaction between the technical system and the environment, and learns therefrom a corresponding functional model that describes the behavior of the technical system in its interaction with the environment. The learning process takes place through minimization of a cost value indicated by a cost function or quality function, which evaluates a performance of the control system in order to obtain model parameters for a control model for the automated controlled guidance of the technical system in the environment.

In particular, model-free reinforcement learning methods are advantageous because no knowledge about the environment and the interaction of the environment with the system is required; however, the interaction time of the system with the environment during the learning process is very high. In contrast, in conventional model-based methods, initially a model structure is specified that provides a basic description of the behavior of the control system in the environment. In this way, the effects of the interaction of the control system with the environment can be mapped. The adaptation of the model structure through a parameter adaptation can be carried out easily and efficiently. However, the conventional method has disadvantages, because the selected model structure may be unsuitable and as a result the parameter adaptation through the optimization of the control model will not yield an optimal result.

The creation and optimization of a control model in connection with reinforcement learning can be carried out in combination with a Bayesian optimization, the quality function being modeled as a Gaussian process model. This enables the creation of an efficient black-box optimizer for control models that would otherwise be costly to create/ parameterize. However, due to the high number of modeling parameters of such control models, the optimization is very complex, so that a large number of measurement processes are necessary, and, due to the high quantity of measurement data, long training times are the rule.

SUMMARY

According to the present invention, a method for ascertaining a control strategy for a technical system using a Bayesian optimization method, a corresponding device, and a control method are provided.

Example embodiments of the present invention are disclosed herein.

According to a first aspect of the present invention, a method is provided for ascertaining a control strategy for a technical system using a Bayesian optimization method, the control strategy being created based on model parameters of a control model and being executable. In accordance with an example embodiment of the present invention, the following steps are carried out for the optimization of the controlling:

providing a quality function whose shape corresponds to a regression function and that evaluates a quality of a controlling of the technical system based on model parameters;

carrying out a Bayesian optimization method based on the quality function in order to iteratively ascertain a model parameter set having model parameters within a model parameter domain that indicates the permissible value ranges for the model parameters;

determining the model parameter domain for at least one of the model parameters as a function of an associated maximum a posteriori estimated value of the quality function.

For the modeling of the controlling of a control system, a control model is created. The control model defines a control strategy and represents a functional relation with which a manipulated variable is calculated based on one or more input variables of the controlling. At least one of the input variables here corresponds to a state variable of the technical system to be controlled.

The form of the control model can be specified in many ways. Thus, the control model can contain a formula that is based on physical laws, such as movement equations, oscillation equations, attenuation behavior, etc. The control model can also be based on a freely selected formula. Frequently, the formula has to take into account a nonlinear behavior of the technical system.

Bayesian optimization methods for ascertaining a control model apply various control strategies iteratively with a technical system, and efficiently optimize the controlling. The quality function is modeled using a Gaussian process regression in order to model the performance of the system model as a function of the model parameters of the control model, the Gaussian progress regression being created based on state variables that have noise. Fundamentally the problem is to find a control strategy that maps a system state onto an input variable vector. For this purpose, a quality function (cost function) that is a function of the model parameters of the control strategy is evaluated over a specified time horizon based on the state variable vectors (made up of a plurality of state variables) and input variable vectors (made up of a plurality of input variables).

In general, Bayesian optimization is applied when an unknown function f, a so-called black-box function, is to be minimized.

This unknown function f can be evaluated and (possibly having noise) observed for a value x. The observed value y results as y=f(x)+e, where e designates the noise. In addition, it is assumed that each evaluation of the unknown function f is expensive, i.e., causes costs in the sense that the evaluation of the unknown function requires a high effort, as is the case for example when an experiment is carried out on a test bench. Due to the expensive evaluation of the unknown function, it is desirable for only a few evaluations to be necessary during the optimization.

Under certain assumptions, such as the continuity of the unknown function, the unknown function can be approximated using a Gaussian process regression in a functional model. For this purpose, after an evaluation of the unknown function at a plurality of evaluation points $(x_1, \ldots, x_n)$ and observation of the corresponding functional values $(y_1, \ldots, y_n)$, using the Gaussian process a model of the unknown function f can be set up. A property of the Gaussian process is that in regions around the evaluation points the model prediction is very good and the unknown function is well approximated. This is reflected in a low uncertainty of the functional model. Far away from evaluation points, the model predictions about the unknown function f are poor, and the uncertainty increases as the distance from the evaluation points increases.

A possible strategy for optimizing the unknown function f is to evaluate the unknown function at many different points (e.g. on a regular grid) and to assume the lowest observed functional value as the result of the optimization. This procedure is inefficient, and many evaluations, with a correspondingly high expense, are necessary to find the optimum.

Instead of this approach, the Gaussian process is used to select new evaluation points. For this purpose, a new evaluation point for the evaluation of the unknown function is selected in such a way that in this way, on the one hand, the model is improved so that the uncertainty of the estimated expected value of the quality function is reduced. For this purpose, generally the evaluation points are selected in regions in which the unknown function has not yet been evaluated (exploration). On the other hand, a new evaluation point for the evaluation of the unknown function is selected in such a way that the goal of minimizing the function is achieved as quickly as possible, or with a low number of measurements at the evaluation points. For this purpose, evaluation points are preferred that, based on the Gauss process, promise low functional values (exploitation). These two contrasting criteria are balanced using a so-called acquisition function.

The acquisition function uses parameters of the quality function, described by a Gauss process model, such as the expected value $\mu(x)$ and the standard deviation $\sigma(x)$ assigned to this expected value. An example is the so-called lower confidence bound (LCB) acquisition function, which is described as follows: $LCB(x)=\mu(x)-k\sigma(x)$. In practice, the factor k is often constant, e.g. defined at a particular value, such as k=2. This new criterion can be efficiently minimized using standard gradient-based methods, and the minimum of $LCB(x)$ then forms the new evaluation point for the unknown function f. Here it is to be noted that for the optimization of the acquisition function an optimization domain has to be defined in which the next evaluation point is sought. This domain is typically selected on the basis of empirical and/or expert knowledge.

According to the above method, the Bayesian optimization method is used to find the model parameters of the control strategy through a minimization of the at first unknown quality function. The goal is to set up the control model in such a way that the behavior of the technical system corresponds as accurately as possible to the desired specifications. If appropriate, the quality function can be constantly updated corresponding to the performance of the control system, as a function of the respective model parameters. For the updating of the quality function, an evaluation of the respective model parameters is required, which requires operation of the control system with the respective model parameters in the real environment. Due to the requirement of really operating the control system, the improvement of the evaluation of the costs through the quality function that is continuously to be updated is very costly. Therefore, it is desirable to minimize as far as possible the number of measurement processes in the real technical system.

In each case, after one or more measurement processes the quality function can be updated with the most recently measured model parameters and the resulting costs, and a new set of test model parameters can be selected in which a specified acquisition function that evaluates the parameters of the quality function is minimized or maximized. The acquisition function is specified in order to ascertain, while balancing exploration and exploitation, a new test model parameter set through minimization/maximization. In the context of the method according to the present invention, "exploration" means that regions of the possible model parameter space for the selection of a new test model parameter are preferred in which the costs have not yet been evaluated through preceding measurement processes. In the context of the method according to the present invention, "exploitation" means that a model parameter set for the next cost evaluation by a measurement process is selected that is estimated as a set of optimal model parameters.

An idea of the above method is to ascertain the model parameters for the control model using a Bayesian optimization method in an optimization domain that is limited in advance. While, given a conventional Bayesian optimization method, it is not easily possible to determine the model parameter domain for individual model parameters in which the search for a control strategy is to be carried out in such a way that the optimization is carried out more efficiently, i.e. with a smaller number of evaluation processes/measurements, on the basis of the previously determined maximum a posteriori estimated value (MAP estimate) from the initially carried-out system identification, appropriate value ranges for the model parameters can be determined in order to optimize them.

In this way, the model parameter domain for the Bayesian optimization of the quality function can be reduced automatically, i.e., without manual specification of value ranges for the model parameters, so that the number of measurement processes for the optimization can be significantly reduced.

In addition, the parametric regression model can map an input variable vector and a system state onto a subsequent system state, and can in particular be trained so as to obtain a weighting matrix.

In addition, the model parameters can be ascertained using an AB learning method for an LQR controller, such that for the at least one maximum a posteriori estimated value in each case an uncertainty measure is determined, the value range of the at least one model parameter being defined around the maximum a posteriori estimated value.

In addition to the maximum a posteriori estimated value, the uncertainty measures of the maximum a posteriori estimated values can also be determined, and these can determine the size of the respective value range for the assigned model parameter. This makes it possible to individually adapt the search region of the optimization for model parameters, i.e. to define the search region for model parameters that have a high degree of uncertainty to be larger than is the case for model parameters that have a lower uncertainty.

It can be provided that the model parameters are ascertained using a K learning method for an LQR controller, the value range of the at least one model parameter being defined around the maximum a posteriori estimated value.

In addition, the value range of the at least one model parameter around the maximum a posteriori estimated value can be determined with a measure that is determined as the product of a specified factor between 0 and 1 of the relevant the maximum a posteriori estimated value.

According to a further specific embodiment of the present invention, the optimization method can be started with initial model parameters that result from a minimization of a prior mean value function, a non-parametric approximation model of the technical system being trained in order to obtain the prior mean value function.

According to a further aspect of the present invention, a device is provided for ascertaining a control strategy for a technical system using a Bayesian optimization method, the control strategy being created based on model parameters of a control model and being executable. In accordance with an example embodiment of the present invention, the device is designed to carry out the following steps for the optimization of the controlling:

providing a quality function whose shape corresponds to a regression function and that evaluates a quality of a controlling of the technical system based on model parameters;

carrying out a Bayesian optimization method based on the quality function in order to iteratively ascertain a model parameter set having model parameters within a model parameter domain that indicates the permissible value ranges for the model parameters; and determining the model parameter domain for at least one of the model parameters as a function of an associated maximum a posteriori estimated value of the quality function.

According to a further aspect of the present invention, a control system is implemented having a technical system and a control unit for controlling the technical system, a control model being implemented in the control unit for providing an input variable vector as a function of state variables of the technical system, a model creation block being provided in order to ascertain model parameters for the control model on the basis of a Bayesian optimization method carried out in an optimization block, the control strategy being created based on model parameters of a control model and being executable, the following steps being carried out for the optimization of the controlling:

providing a quality function whose shape corresponds to a regression function and that evaluates a quality of a controlling of the technical system based on model parameters;

carrying out a Bayesian optimization method based on the quality function in order to iteratively ascertain a model parameter set having model parameters within a model parameter domain that indicates the permissible value ranges for the model parameters;

determining the model parameter domain for at least one of the model parameters as a function of an associated maximum a posteriori estimated value of the quality function.

BRIEF DESCRIPTION OF THE DRAWINGS

Below, specific embodiments of the present invention are explained in more detail based on the figures.

DETAILED DESCRIPTION OF EXAMPLE EMBODIMENTS

Figure 1:
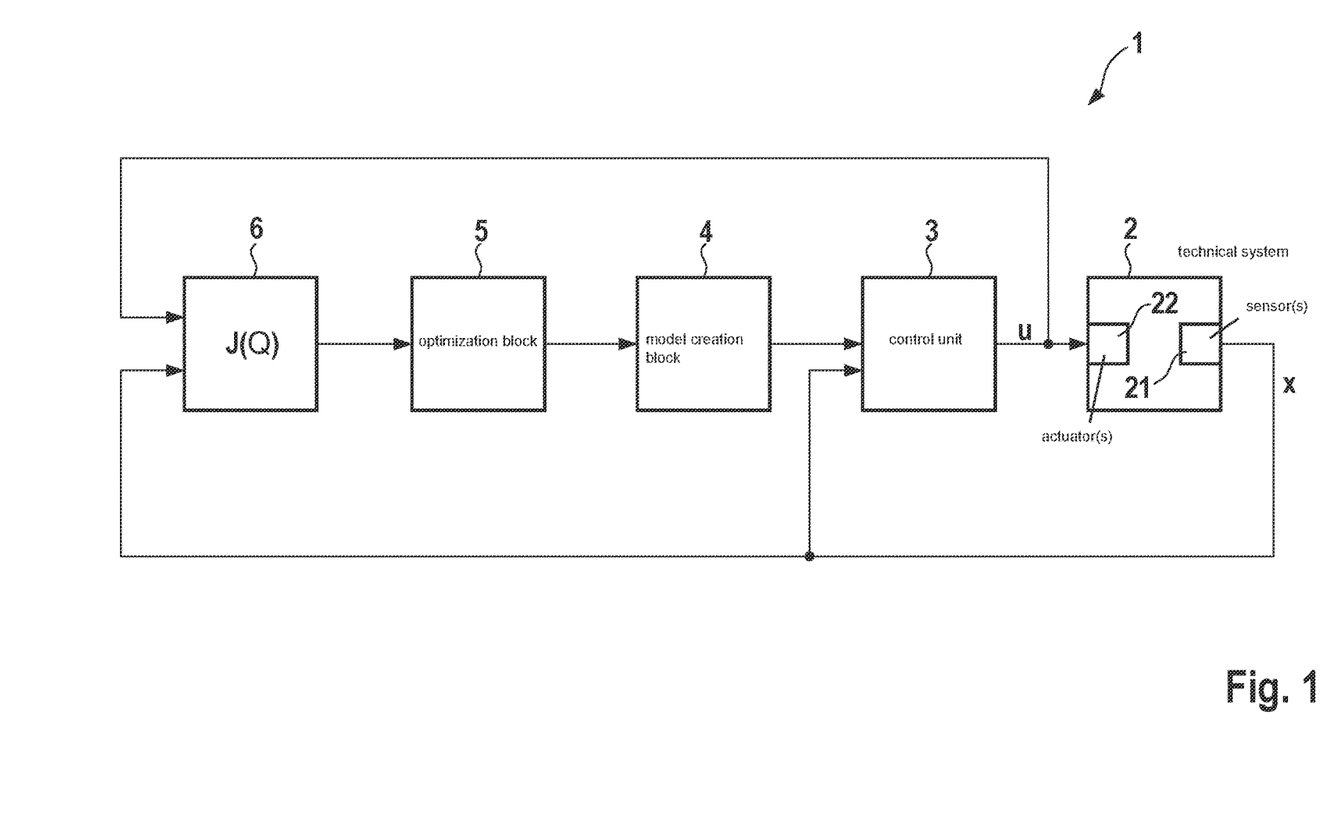
FIG. 1 shows a schematic representation of a control system having a control unit and a technical system to be controlled, in accordance with an example embodiment of the present invention.

FIG. 1 shows a schematic representation of a self-adapting control system 1 that is designed for the controlling of a technical system 2. A technical system 2 can be for example an internal combustion engine of a motor vehicle, or a subsystem thereof. A control unit 3 controls technical system 2 with a sequence of input variables u as manipulated variables that cause particular operating points of technical system 2. As a rule, input variables u include a number of a plurality of input variables that are combined in an input variable vector $u \in \mathbb{R}^d$. In addition, for each of the input variables (elements of input variable vector u), there is a permissible value range. In addition, the controlling of technical system 2 results in one or more state variables that are measured at an input variable vector u to be measured, and that are represented in the form of a state variable vector x.

Using one or more sensors 21 that are part of technical system 2, courses of one or more measurement variables $x_1 \ldots x_D$ can be acquired that respectively represent corresponding state variables $x_1(t) \ldots x_D(t)$, which respectively indicate the system states x of technical system 2. Here D corresponds to the number of state variables. In this way, the system state of technical system 2 is acquired using the one or more sensors 21, and is communicated to control unit 3 as state variables of a state variable vector x.

Input variables u correspond to manipulated variables of control unit 3 that are ascertained based on state variables x and the control strategy $\pi_\theta(x)$. The operation of technical system 2 takes place as a function of the input variables u(t) using one or more actuators 22 of technical system 2. For example, in this way a movement of a robot or vehicle can be controlled, or a controlling can take place of a drive unit or of a driver assistance system of a vehicle. An input variable u can for example correspond to an electrical voltage that is applied to an electromechanical positioner as actuator 22. Actuator 22 is controlled corresponding to the one or more input variables u, and carries out a corresponding action. Here, actuator 22 can include a control logic system (not necessarily constructively integrated) that ascertains, from input variables u, a control variable with which the relevant actuator 22 is controlled.

In an exemplary embodiment, control unit 3 is used to control an internal combustion engine as technical system. For this purpose, a throttle valve position, a fuel supply, and/or the like can be specified as input variables to the throttle valve positioner or to the controlling for injection valves, and corresponding state variables, such as a rotational speed, a load, an engine temperature, can be received.

In an exemplary embodiment, control unit 3 is used for the controlling of an at least partly autonomous robot, in particular an at least partly autonomous motor vehicle, as technical system 2. Sensor 21 can be for example one or more video sensors, preferably situated in the motor vehicle, and/or one or more radar sensors and/or one or more ultrasound sensors and/or one or more lidar sensors and/or one or more position sensors (GPS). Alternatively or in addition, sensor 21 can also include an information system that ascertains an item of information about a state of the technical system (motor vehicle), such as a weather information system that ascertains a current or future state of the weather in an environment of the motor vehicle.

In a further exemplary embodiment of the present invention, control unit 3 is used for the controlling of a function in a motor vehicle as technical system. For this purpose, a gas pedal position, a steering intervention in the form of a wrist torque or a steering position, environmental information such as positions of objects in the environment, a braking action, and/or the like can be specified as input variables, and corresponding state variables can be received that indicate the driving behavior of the motor vehicle, such as vehicle speed, curve position, distance from objects in the environment, and the like.

Control unit 3 can, with the plurality of measurement variables $x_1 \ldots x_D$, for example detect states or state curves of the at least partly autonomous robot, such as an engine rotational speed, a vehicle speed, a fuel consumption, an engine temperature, a longitudinal speed and/or transverse speed, a steering angle, a yaw rate, and the like. Actuator 32, preferably situated in the motor vehicle, can be for example a brake, a drive, or a steering mechanism of the motor vehicle.

Alternatively, the at least partly autonomous robot can also be some other mobile robot (not shown), for example one that moves by flying, swimming, immersion, or stepping. The mobile robot can for example also be an at least partly autonomous lawnmower, or an at least partly autonomous cleaning robot.

In still other alternatives, the at least partly autonomous robot can also be a household device (not shown), in particular a washing machine, a stove, an oven, a microwave, or a dishwashing machine. With sensor 21, for example an optical sensor, a state of an object treated using the household device can be acquired such as, in the case of the washing machine, a state of laundry in the washing machine. Using control unit 3, a type or a state of this object can then be ascertained and can be characterized by measurement variables $x_1 \ldots x_D$. The input variables can then be ascertained in such a way that the household device is controlled as a function of the ascertained type or ascertained state of the object. For example, in the case of the washing machine this machine can be controlled as a function of the material of which the laundry situated therein is made. Input variables u(t) can then be selected as a function of the ascertained material of the laundry.

In a further specific embodiment of the present invention, control unit 3 can be used for the controlling of a manufacturing machine (technical system 3) of a manufacturing system, by controlling an actuator 22 that controls this manufacturing machine using input variables. Manufacturing machine 11 can for example be a machine for stamping, sawing, drilling, milling, lathing, and/or cutting.

Sensor 21 can then for example be an optical sensor that acquires for example properties of manufactured products. It is possible for actuator 32 that controls the manufacturing machine to be controlled as a function of the ascertained properties of the manufactured product, so that the manufacturing machine correspondingly carries out a subsequent processing step of this manufactured product. It is also possible for sensor 31 to ascertain the properties of the manufactured product processed by the manufacturing machine, and, as a function thereof, to adapt a controlling of the manufacturing machine for a subsequent manufactured product.

The controlling of control unit 3 follows a control strategy. Through a dynamic process, the control strategy is to be adapted so that the system behavior becomes optimal with respect to a quality function. For this purpose, an optimization method is carried out that optimizes model parameters of the control model forming the basis of the control strategy in such a way that the performance of controlled technical system 2 is optimized. For this purpose, a control model (dynamic model) is created in a model creation block 4, which is the basis for the control strategy of control unit 3. Model creation block 4 ascertains the model parameters for the control model on the basis of a Bayesian optimization method carried out in an optimization block 5. This takes place based on a specified quality function that is determined or specified in a quality function block 6.

In further preferred specific embodiments, control unit 3, model creation block 4, optimization block 5, and cost function block 6 are implemented in a computing unit. The computing unit includes control device 2, one or more processors, and at least one machine-readable storage medium on which instructions are stored that, when they are executed on the processors, cause the computing unit to carry out the method according to the present invention.

Technical system 2 corresponds to a dynamic system that, using a control unit 3, is controlled in an optimal manner with a suitable control strategy that is to be correspondingly created using a Bayesian optimization method. The Bayesian optimization method is used to ascertain the control model by, during the optimization method, iteratively applying various test model parameter sets for the controlling of technical system 2, and adapting the model parameters based on the resulting state variables. Here, a quality function is modeled using a Gauss process regression by which the performance of the controlling of the technical system is defined as a function of the model parameters. The performance of the controlling results from a specified quality criterion that assigns a quality of the controlling to the resulting state variables. The state variables have tolerances, so that the quality function is preferably created using a Gauss process regression.

Fundamentally, the problem is that of finding a control strategy that maps a system state x onto an input variable vector $u=\pi_\theta(x)$ with $\pi_\theta: \mathbb{R}^{n_x} \to \mathbb{R}^{n_u}$, where $\theta \in \Theta \subset \mathbb{R}^{n_\theta}$ represent model parameters of the control strategy in the model parameter domain $\Theta$. A quality function J that is a function of the model parameters $\theta$ is specified over a predetermined time horizon $t=0 \ldots T$ based on the state vectors x and input variable vectors u; here the model parameters $\theta$ are to be optimized by the optimization method $$\min_\theta J(\theta) = \min_\theta \sum_{t=0}^{T} \mathbb{E}[c(x_t, \pi_\theta(x_t))]$$

$$\text{s.t. } x_{t+1} = f(x_t, \pi_\theta(x_t)) + v$$

where $\mathbb{E}$, corresponds to an expected value, $c(x_t, u_t)$ represent the costs of the state indicated by state vector $x_t$ for input variable vector $u_t$, and $f: \mathbb{R}^{n_x} \times \mathbb{R}^{n_u} \to \mathbb{R}^{n_x}$ represent the state transition model that describes the dynamics of technical system 2 and that is additionally subject to the noise variable $v \sim N(0, \Sigma_v)$.

The Bayesian optimization method is used to find the optimized model parameters θ* of a control strategy through a minimization of the quality function. The goal is for the control strategy to enable a controlling that is as optimal as possible of technical system 2 with control unit 3, where "optimal" refers to a minimization of the costs determined by the quality function, in relation to a specified performance of the overall system of control unit 3 and technical system 2.

The quality function thus correspondingly provides the deviation of the behavior of real technical system 2 during time window t=0 . . . T in relation to a specified performance with costs J. The evaluation of the quality function thus requires the operation of technical system 2 in the real environment in a measurement process. Due to the necessity of really operating the control system that includes technical system 2 and control unit 3, the evaluation of the costs J becomes very costly, so that the number of measurement processes at the real technical system 2 for the evaluation of a particular control strategy is to be minimized to the greatest possible extent.

The creation of a controlling can be carried out using an LQR controller that requires a linear dynamic model of the system to be controlled. This LQR controller can be described by a feedback matrix K, while elements of the feedback matrix as model parameters can be completely or partly adapted for the optimization.

In the following, it is assumed that the control strategy corresponds to a linear state control strategy of $\pi_\theta(x) = -K(\theta)x$.

Linear control strategies have the advantage that they have a low dimensionality compared to other control models. In addition, the linear control strategy can easily be implemented in controllers, thus increasing the efficiency of the Bayesian optimization.

In connection with the Bayesian optimization, a linear quadratic regulator, a so-called LQR controller, can be used, as is known in the field of creation of control strategies. In the LQR controller, the system behavior and the interaction with the environment during measuring processes are ascertained through a controlled operation with a set of varying input variable vectors and the acquisition of resulting state variable vectors. Here, the system dynamics is linearized according to $$f(x_t, u_t) \approx Ax_t + Bu_t$$

and the costs are correspondingly squared $$c(x_t, u_t) \approx x_t^T Q x_t + u_t^T R u_t$$

Through these approximations, in model creation block 4 an LQR feedback matrix can be created that represents the dynamic model and that is generally designated K=dlqr(A, B,Q,R). The control strategy optimization is carried out by directly adapting the feedback matrix (K-Learning), some of the entries, or each entry, of the feedback matrix corresponding to a model parameter for the optimization. In addition, it is also possible for only the components of feedback matrix K that correspond to system matrices A and B to be assumed as model parameters to be optimized, each entry of matrices A and B corresponding to a model parameter.

Alternatively, in feedback matrix K without the matrices Q and R (weighting matrices) can be assumed as model parameters to be optimized. Here, it is sufficient to adapt only the diagonal entries of the weighting matrices, which have the following form:

$$K^{QR}(\theta) = dlqr(A, B, Q(\theta), R(\theta))$$

with $$Q(\theta) = \text{diag}(10^{\theta_1}, \ldots, 10^{\theta_{n_x}})$$

and $$R(\theta) = \text{diag}(10^{\theta_{n_x+1}}, \ldots, 10^{\theta_{n_x+n_u}})$$

Corresponding to the belonging of the model parameters to the above matrices, these methods are called K-Learning, AB-Learning, and QR-Learning. In Bayesian optimization, the parameter space has to be adequately covered with respect to the length scales of the quality function in order to find a good estimation of the optimized model parameters.

However, without previous knowledge it is difficult to select the value ranges for the individual model parameters, i.e. the model parameter domain, for the optimization. However, this is essential for an efficient optimization method without an excessive number of measurement processes. The above method therefore provides the selection of a suitable search region for the model parameters, so that the number of measurement processes can be reduced. This is required in particular in cases of high dimensionality, because there a manual setting of the value ranges of each of the model parameters is not easily possible. Therefore, the value ranges of the model parameters are first ascertained by learning a distribution via dynamic models, and subsequently using this distribution to select the value ranges for each of the model parameters. The distribution is obtained using Bayesian linear regression, through recorded data values of the state variable vectors and input variable vectors, in order to obtain an approximate linear model of the system dynamics. This results in a Gaussian distribution over the models $$p(vec(A,B)|\text{Data}) = N(vec(A,B)|\mu^{AB}, \Sigma^{AB})$$

where $\mu^{AB}$ indicates the maximum a posteriori (MAP) estimated value, the notation vec(.,.) indicating that the matrices A and B are transformed into a vector.

After the value ranges of the model parameters are selected, it is possible that in certain dimensions the value ranges of the model parameters have been selected too conservatively. This can occur for example when the scaling parameter β is too small, or due to a model deviation. As a result, the optimal model parameter vector may not lie within the selected model parameter domain. Therefore, the model parameter domain can be dynamically adapted during the optimization.

During the running of the Bayesian optimization, an estimated value of the optimum of the model parameter values is present, i.e., the minimum of the approximated quality function in the current model parameter domain. If the Bayesian optimization yields the result that the location of the estimated optimum is at a boundary of the model parameter domain, then it is probable that better model parameters lie outside the current model parameter domain. Therefore, it is proposed to expand the value range of the model parameter whose value lies at the boundary of the model parameter domain. This dynamic adaptation of the model parameter domain can be carried out in various ways.

The adaptation of the value ranges for model parameters makes it possible, starting from a limited value range, to dynamically adapt this range during the optimization only for those dimensions of the model parameter vector in which the optimization relates to a border area of the model parameter domain. In this way, the optimization can be carried out more efficiently overall, so that the convergence is significantly improved. In addition, potential model errors can be better compensated, so that the optimized system model shows better performance. Through the improvement of the efficiency, it is possible to scale the Bayesian optimization to high-dimensional control strategies.

In order to create the quality function for performance of the control system with respect to model parameter sets, first of all data are provided.

$$D=\{\theta_i; J(\theta_i)\} \text{ with } i=1 \ldots n$$

This is used to train an initial Gauss process model as the quality function that maps the test model parameters onto costs.

$$\mu(\theta^*)=kK^{-1}J\sigma^2(\theta^*)=k(\theta^*,\theta^*)-kK^{-1}k^T$$

where K corresponds to the covariance matrix, with $$K_{ij}=k(\theta_i,\theta_j), k=[k(\theta_1,\theta^*), \ldots, k(\theta_n,\theta^*)] \text{ and }$$
$$J=[J(\theta_1), \ldots, J(\theta_n)]$$

In this way, the Gauss process model supplies both the expected value, i.e., the costs J, and also the uncertainty of this expected value.

From this, the initial model parameter domain can now be ascertained, because without previous knowledge it is difficult to select the value ranges for the individual model parameters, i.e. the model parameter domain, for the optimization. The selection of a suitable model parameter domain is essential for an efficient optimization method not having an excessive number of measurement processes. Therefore, in step S3 a suitable search area for the model parameters is selected, so that the number of measurement processes can be reduced. This is required in particular given high dimensionality, because there a manual setting of the value ranges of each of the model parameters is not easily possible. Therefore, the value ranges of the model parameters are ascertained based on the previously trained Gauss process model, and subsequently this distribution is used to select the value ranges for each of the model parameters.

The distribution is obtained through Bayesian linear regression, using recorded data values of the state variable vectors and input variable vectors in order to obtain an approximated linear model of the system dynamics. This results in a Gauss distribution over the models $$p(vec(A,B)|Data)=N(vec(A,B)|\mu^{AB},\Sigma^{AB})$$

where $\mu^{AB}$ indicates the maximum a posteriori (MAP) estimated value, and the notation vec(.,.) indicates that the matrices A and B are transformed into a vector.

System 1 of FIG. 1 further includes an optimization unit 22. Optimization unit 22 can be provided in control device 2 or, alternatively, separately therefrom. Optimization unit 22 has the aim of ascertaining for controller 21 a control model by which the dynamic technical system 3 can be controlled. For this purpose, optimization unit 22 carries out an iterative optimization method by which the control model is created by minimizing a quality function. The minimization of the quality function can be expressed as:

$$J = \lim_{T \to \infty} \min_{u_0:T} \mathbb{E}\left[\frac{1}{T}\sum_{t=0}^{T} x_t^T Q x_t + u_t^T R u_t\right]$$

$$\text{s.t. } x_{t+1} = f(x_t, u_t) + v, \, v \sim N\left(0, \sum_v\right)$$

where the initial condition is specified by $x_0$. $x_t$ here corresponds to a state vector for a system state at time t, and $u_t$ corresponds to an input variable vector at time t. Cost matrices Q and R are assumed as positive semi-definite or positive definite. Based on the linear approximation of the dynamic behavior $f(x_t, u_t)=Ax_t+Bu_t$ and under the assumption of a linear state feedback controller $u_t=\pi(x_t)=-Kx_t$ e with a control strategy $\pi$, there results an approximately static solution of the above minimization problem, with $$K=(R+B^TPB)^{-1}B^TPA$$

and $$0=A^T(P^{-1}+BR^{-1}B)^{-1}A-P+Q$$

where the latter equation corresponds to the time-discrete algebraic Riccati equation (DARE), which can be solved efficiently for P using the Kleinman method. The linear state feedback controller is described in the following using the abbreviated notation dlqr (A, B, Q, R).

In control theory, the solution of the latter equation above is known as an LQR (Linear Quadratic Regulator) controller. Frequently, the modeling of an LQR controller leads to unsatisfactory results due to the linear approximation of the system dynamics, which is often an adequately accurate approximation only in the immediate vicinity of the operating point.

In the following, a control strategy search is to be carried out based on a Bayesian optimization method. This method provides a Gauss process regression. A Gauss process regression is a non-parametric method for modeling an a priori unknown function $J(\theta): \Theta \mathbb{R} \mapsto$. Using the Gauss process regression, given noisy observations of the system behavior both the curve of the functional values and the uncertainty of the prediction of each of the functional values can be determined. The Gauss process can be understood as a distribution over functions, and is defined by a prior mean value function $m(\theta)$ and a covariance function $k(\theta, \theta')$. The mean value function indicates the a priori knowledge about the quality function $J(\theta)$ to be mapped, and is often assumed as zero. The covariance function is also called the kernel, and defines the correlation between each two functional values $J(\theta)$ and $J(\theta')$, with $\theta, \theta' \in \Theta$.

Under the assumption of n noisy observed values: $\mathcal{D}_n = \{(\theta_i, \hat{J}(\theta_i))\}$ with $\hat{J}(\theta)=J(\theta)+\omega, \omega \sim N(0, \sigma_\omega^2)$, the prior distribution over the predictions for the measured data can be created in order to obtain the posterior prediction of the quality function at each point $\theta^* \in \Theta$. The posterior mean value and covariance are given by $$\mu_n(\theta^*)=m(\theta^*)+k_n(\theta^*)K_n^{-1}\hat{y}_n, \, \sigma_n^2(\theta^*)=k(\theta^*,\theta^*)-k_n(\theta^*)K_n^{-1}k_n^T(\theta^*)$$

where $$\hat{y}=[\hat{J}(\theta_1)-m(\theta_1), \ldots, \hat{J}(\theta_n)-m(\theta_n)]^T, k_n(\theta^*)=[k(\theta^*,\theta_1), \ldots, k(\theta^*,\theta_n)]$$

and the symmetrical Gram matrix $K_n \in \mathbb{R}^{n \times n}$ includes the entries $$[K_n]_{(i,j)}=k(\theta_i,\theta_j)+\delta_{i,j}\sigma_\omega^2$$

The Gauss process regression is used to model the behavior of technical system 2 and to evaluate its optimality. The behavior of the system made up of the controller and technical system 2 is represented by a quality function that represents a functional relation between the model parameters and the resulting costs of the technical system controlled based on a control strategy defined by the model parameters. The Bayesian optimization method is then applied in order to optimize the quality function. This is not possible analytically, and therefore has to be done iteratively. The outlay for the optimization should therefore be limited to the smallest possible number of iterations.

An iteration corresponds to a measurement process of an application of a control strategy, defined by model parameters θ* that are to be considered, to real technical system 2. From this there results a new data pair $\theta_{n+1}, \hat{J}(\theta_{n+1})$ that is added to the training data for the Gauss process.

$$\mathcal{D}_{n+1} = \mathcal{D}_n \cup (\theta_{n+1}, \hat{J}(\theta_{n+1}))$$

After each measurement process, a new evaluation point is selected by maximizing an acquisition function $\sigma(\theta_n, \mathcal{D}_n)$, which can be carried out efficiently using numerical optimization technology, such as L-BFGS. Alternatives for the acquisition functions may be used, for example probability of improvement (PI), expected improvement (EI), and upper confidence bound (UCB). All of these functions offer a trade-off between exploration, i.e. preferring regions of the input variable vectors in which the quality function has not yet been evaluated, and exploitation, i.e. preferring a region in which an estimated optimum (minimum) of the quality function lies.

For the Bayesian optimization, only the overall behavior of a technical system operated through a measurement process is evaluated, while the trajectory data, or the curve data, are usually discarded. For the system identification using a Bayesian linear regression, the state variables can be sampled with a high frequency in order to obtain an uncertainty measure for the model to be estimated.

In classical parametric regression, a model y(x,w) is assumed having an input x and weights or parameters w that are used to estimate a noisy target variable t.

Under the assumption that the noise follows a Gauss distribution with precision (inverse variance) γ, the posterior distribution corresponds to the weights for n measurements that are indicated in a matrix $X_n = [x_1^T, \ldots, x_n^T]^T$ and respective target values that are indicated in a vector $t_n = [t_1, \ldots, t_n]^T$:

$$p(w|t) = N(w|m_n, S_n), \theta^{MAP} = m_n = S_n(S_0^{-1} m_0 + \gamma X^T t),$$
$$S_n^{-1} = S_0^{-1} + \gamma X^T X$$

where n corresponds to the number of data points, γ corresponds to a specified constant that describes the noise in the data, $m_0$ corresponds to an a priori mean value of the model parameters to be estimated (the mean values of the Gaussian prior for the model parameters), $S_0$ corresponds to an a priori covariance of the model parameters to be estimated (the covariances of the Gaussian prior for the model parameters), X corresponds to the locations of the data points (combined in a matrix), t corresponds to the functional values of the data points (combined in a vector), $m_n$ corresponds to the a posteriori expected values (mean values) of the model parameters to be estimated, and $S_n$ corresponds to the a posteriori covariance of the model parameters to be estimated.

The maximum posterior estimated value (MAP estimated value) of the weights w corresponds to the mean value of the posterior distribution, i.e. $w^{MAP} = m_n$, and its covariance corresponds to $S_n^{-1}$.

The ascertaining of the control model takes place through reinforcement learning in order to ascertain a parameterization for a linear state feedback controller using a Bayesian optimization method.

In the following, measures for accelerating the convergence of the optimization method are proposed.

As an initial assumption, it is assumed that nonlinear technical system 2 is approximated by a linear model, and the Bayesian optimization method is used to optimize the entries in system matrices A, B. The resulting control model $K^{AB}$ can then be written as $$\pi^{AB}(x_t; \theta) = -K^{AB}(\theta)x_t, K^{AB}(\theta) = P = dlqr(A(\theta), B(\theta), Q, R)$$

This method is called the AB learning method.

An alternative learning method is the so-called K-learning method, in which optimization takes place directly into the feedback reinforcement matrix. Here, the control module corresponds to $\pi^K(x_t; \theta) = -K^K(\theta)x_t$, which, in contrast to the approach described above, does not use the above and is therefore a model-free approach.

Figure 2:
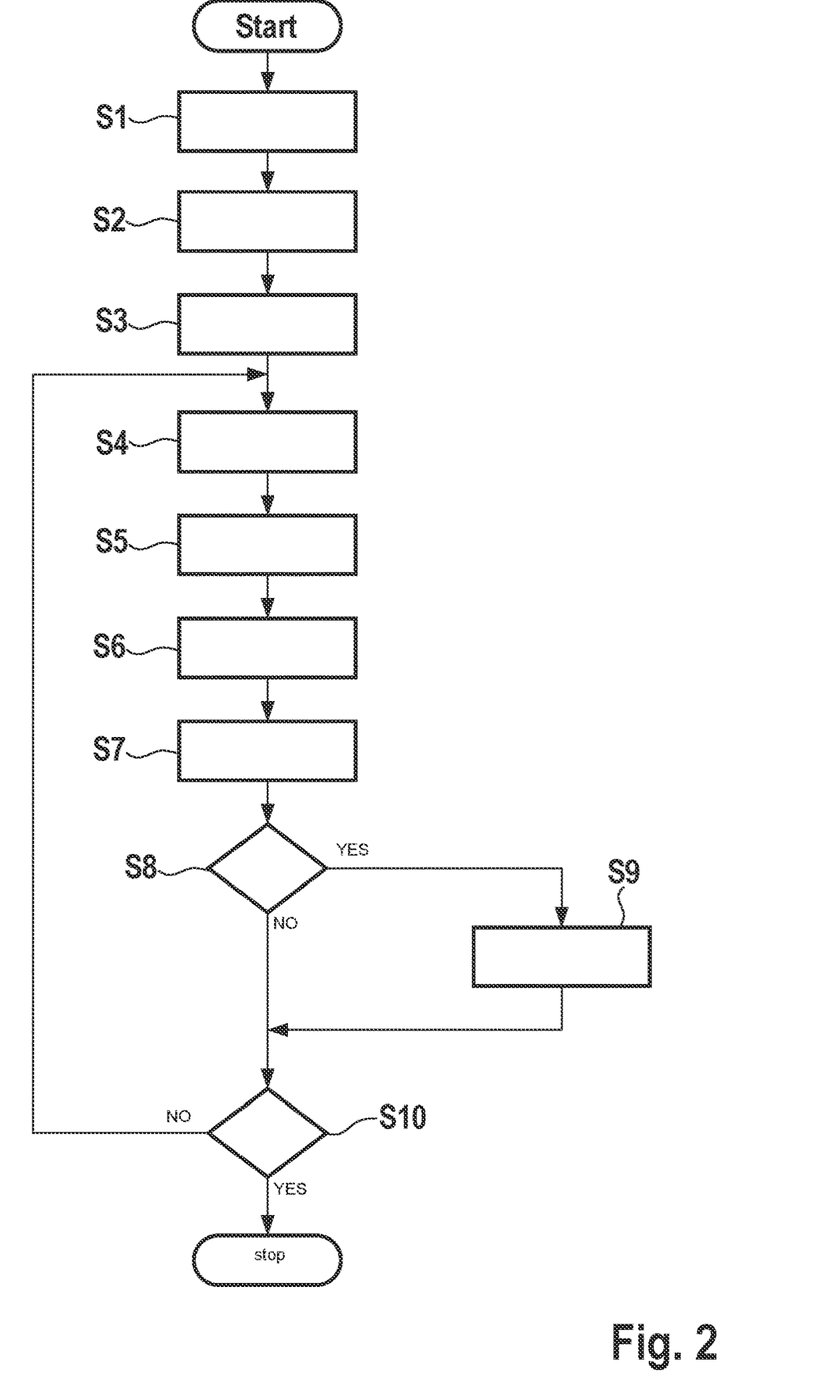
FIG. 2 shows a flow diagram illustrating a method for creating a control model using a reinforcement learning method, in accordance with an example embodiment of the present invention.

On the basis of the flow diagram of FIG. 2, the method for creating a control model using a Bayesian optimization method is now described.

In step S1, first the MAP weighting matrices $A^{MAP}, B^{MAP}$ are ascertained. This can be done without previous knowledge about the control model. In the identification process for technical systems, a goal is to ascertain the successor state $x_{t+1}$ of technical system 2 based on a given current state $x_t$ and an input variable vector $u_t$. Thus, the following holds:

$$y(x,w) \hat{=} Ax_t + Bu_t, x \hat{=} (x_t, u_t), w \hat{=} (A,B), t \hat{=} x_{t+1}$$

The maximum posterior estimated value (MAP estimated value) corresponds to the weights $\theta^{MAP}$.

The advantage of the use of a Bayesian linear regression is that it obtains not only the MAP estimated value of the mean value $\theta^{MAP}$, but also an estimation of the uncertainty $\sigma^{MAP}$. These correspond to the entries of the diagonals of matrix $S_n$.

In step S2, the value ranges for the model parameters to be determined for the control model are defined. The Bayesian optimization has to cover the value ranges of the model parameters as adequately as possible, including with respect to the length scales of the quality function. It is often difficult to determine a priori in which value ranges the model parameters, i.e. the entries in matrix K, have to be optimized in order to achieve a good controlling behavior.

For this purpose, with the aid of the MAP estimated values $w^{MAP}, \sigma^{MAP}$ from the system identification of step S1, appropriate value ranges in which the model parameters are subsequently optimized are selected for each of the model parameters.

For the AB learning method, the choice of value ranges Θ (model parameter domain) starting from the MAP estimated values $\theta^{MAP}, \sigma^{MAP}$ corresponds to the matrix K and to the variances of the parameter estimated values. Thus, the iσ variance around the MAP estimated values can be assumed as value ranges for the parameters, so that the following holds:

$$\theta^{AB}[(\theta_1^{MAP} - i\sigma_1, \theta_1^{MAP} + i\sigma_1] \times \ldots \times [\theta_{n_\theta}^{MAP} - i\sigma_{n_\theta}, \theta_{n_\theta}^{MAP} + i\sigma_{n_\theta}]$$

where i can preferably be assumed to be between 1 and 4, in particular 2.

In this way, model parameters that have a higher degree of uncertainty are assigned a larger value range for the optimization during the Bayesian optimization method, and, conversely, well-identified model parameters, i.e. model parameters having low uncertainty, are assigned a smaller value range.

In the K-learning method, the value ranges are constructed using the LQR controller for the estimated system:

$$K^{MAP}=dlqr(A^{MAP},B^{MAP}Q,R)$$

The value ranges of the model parameters of the control model can here be provided between 0 and twice the MAP estimated value of the respective model parameter.

$$\Theta^K=[0,2\theta^{MAP}]\times \ldots \times[0,2\theta_{n_\theta}^{MAP}]$$

In general, the value ranges of the model parameters of the control model can be specified:

$$\Theta^K=[\theta_1^{MAP}-k,\theta_1^{MAP}+k]\times \ldots \times[\theta_{n_\theta}^{MAP}-k,\theta_{n_\theta}^{MAP}+k]$$

with $0<k=<\theta_{n_\theta}^{MAP}$

In step S3, a prior mean value function is ascertained. This uses the approximation model of technical system 2 to ascertain a simple simulator of technical system 2. This simulator is used to estimate the shape of the quality function. The approximation model of technical system 2 is determined for example using a Gauss process based on a small number of measurement points. The number of measurement points used for this can be between 10 and 100. Subsequently, an approximated prior mean value function of the costs can be constructed e.g. through the Gauss process regression.

Subsequently, initial model parameters $\theta_0$ are determined in step S4 by minimizing the prior mean value function.

Using the initial model parameters $\theta_0$, in step S5 the control model thereby defined can be evaluated in a measurement process, and corresponding minimum costs $\hat{J}(\theta_0)$ can be determined according to the quality function.

Subsequently, in step S6 the next model parameters $\theta_{n+1}$ are determined for the next iteration of the optimization method from the maximization of the acquisition function $\alpha(\theta_n,\mathcal{D}_n)$, taking into account the last-determined data pair $\theta_n,\hat{J}(\theta_n)$.

Using the current model parameters $\theta_{n+1}$, in step S7 the control model thereby defined can be evaluated in a next measurement process, and corresponding minimum costs $\hat{J}(\theta_{n+1})$ can be determined.

Subsequently, in step S8 the training data of the last-ascertained data pair are added.

$$\mathcal{D}_{n+1}=\mathcal{D}_n\cup(\theta_{n+1},\hat{J}(\theta_{n+1}))$$

Subsequently, in step S9 a stop criterion is checked that for example indicates whether an adequate performance of the computing model has been achieved, or whether an adequate convergence is present. If the stop criterion is met (alternative: yes), then the method is ended with step S10; otherwise (alternative: no) a jump takes place back to step S6.

In step S10, the last-ascertained model parameters for the control strategy are applied.

What is claimed is:

1. A method for ascertaining a control strategy for a technical system using a Bayesian optimization method, the control strategy being created based on model parameters of a control model and being executable, the method comprising the following steps for optimization of the controlling:
providing a quality function whose shape corresponds to a regression function and that evaluates a quality of a controlling of the technical system based on the model parameters;
carrying out a Bayesian optimization method based on the quality function to iteratively ascertain a model parameter set having the model parameters within a model parameter domain that indicates permissible value ranges for the model parameters; and
determining the model parameter domain for at least one of the model parameters as a function of an associated maximum a posteriori estimated value of the quality function.

2. The method as recited in claim 1, wherein a parametric regression model maps an input variable vector and a system state of the technical system onto a subsequent system state, and being correspondingly trained in order to obtain a weighting matrix.

3. The method as recited in claim 1, wherein the model parameters are ascertained using an AB learning method for a linear quadratic regulator (LQR) controller, an uncertainty measure being determined in each case for the at least one maximum a posteriori estimated value, the value range of the at least one model parameter being defined around the maximum a posteriori estimated value.

4. The method as recited in claim 3, wherein the value range of the at least one model parameter being determined around the maximum a posteriori estimated value with specification of an uncertainty of an expected value.

5. The method as recited in claim 1, wherein the model parameters are ascertained using a K-Learning method for a linear quadratic regulator (LQR) controller, the value range of the at least one model parameter being defined around the maximum a posteriori estimated value.

6. The method as recited in claim 5, wherein the value range of the at least one model parameter is determined around the maximum a posteriori estimated value with a measure that is determined as a product of a specified factor between 0 and 1 of the maximum a posteriori estimated value.

7. The method as recited in claim 1, wherein the optimization method is started with initial model parameters that result from a minimization of a prior mean value function, a non-parametric approximation model of the technical system being trained in order to obtain the prior mean value function.

8. A device configured to ascertain a control strategy for a technical system using a Bayesian optimization method, the control strategy being created based on model parameters of a control model and being executable, the device being configured to carry out the following steps for optimization of the controlling:
providing a quality function whose shape corresponds to a regression function and that evaluates a quality of a controlling of the technical system based on the model parameters;
carrying out a Bayesian optimization method based on the quality function to iteratively ascertain a model parameter set having the model parameters within a model parameter domain that indicates permissible value ranges for the model parameters; and
determining the model parameter domain for at least one of the model parameters as a function of an associated maximum a posteriori estimated value of the quality function.

9. A control system, comprising:
a technical system; and
a control unit configured to control the technical system, a control model being implemented in the control unit and being configured to provide an input variable vector as a function of state variables of the technical system, a model creation block being provided which is configured to ascertain model parameters for the control model based on a Bayesian optimization method carried out in an optimization block, the control strategy being created based on model parameters of a control model and being executable, the controlling being optimized by:

providing a quality function whose shape corresponds to a regression function and that evaluates a quality of a controlling of the technical system based on the model parameters;

carrying out a Bayesian optimization method based on the quality function to iteratively ascertain a model parameter set having the model parameters within a model parameter domain that indicates permissible value ranges for the model parameters; and determining the model parameter domain for at least one of the model parameters as a function of an associated maximum a posteriori estimated value of the quality function.

10. A non-transitory machine-readable storage medium on which is stored a computer program for ascertaining a control strategy for a technical system using a Bayesian optimization method, the control strategy being created based on model parameters of a control model and being executable, the computer program, when executed by a computer, causing the computer to perform the following steps for optimization of the controlling:

providing a quality function whose shape corresponds to a regression function and that evaluates a quality of a controlling of the technical system based on the model parameters;

carrying out a Bayesian optimization method based on the quality function to iteratively ascertain a model parameter set having the model parameters within a model parameter domain that indicates permissible value ranges for the model parameters; and determining the model parameter domain for at least one of the model parameters as a function of an associated maximum a posteriori estimated value of the quality function.

\* \* \* \* \*